United States Patent [19]

Micale

[11] Patent Number: 4,891,245
[45] Date of Patent: * Jan. 2, 1990

[54] ELECTROPHORETIC DISPLAY PARTICLES AND A PROCESS FOR THEIR PREPARATION

[75] Inventor: Fortunato J. Micale, Bethlehem, Pa.

[73] Assignee: Koh-I-Noor Rapidograph, Inc., Bloomsbury, N.J.

[*] Notice: The portion of the term of this patent subsequent to May 12, 2004 has been disclaimed.

[21] Appl. No.: 842,608

[22] Filed: Mar. 21, 1986

[51] Int. Cl.$^4$ .................... B32B 7/02; H01B 1/06
[52] U.S. Cl. .................... 427/213.3; 427/216; 427/221; 428/402.24; 252/520
[58] Field of Search .................... 252/500, 518, 520; 350/357; 313/385; 427/213.3, 216, 221; 428/402.21, 402.22, 402.24; 523/205, 211

[56] References Cited

U.S. PATENT DOCUMENTS

| | | | |
|---|---|---|---|
| 2,872,427 | 2/1959 | Schroeder | 260/296 |
| 2,954,358 | 9/1960 | Hurwitz | 260/29.6 |
| 3,016,308 | 1/1962 | Macaulay | 427/213.3 |
| 3,390,114 | 6/1968 | Uhl et al. | 260/29.6 |
| 3,575,882 | 4/1972 | Vandegaer et al. | 252/316 |
| 3,577,515 | 5/1971 | Vandegaer | 424/32 |
| 3,900,669 | 8/1975 | Kiritani | 428/307 |
| 3,996,061 | 12/1976 | Johnson | 127/29 |
| 4,010,038 | 3/1977 | Iwasaki et al. | 106/22 |
| 4,026,857 | 5/1977 | Brown et al. | 428/418 |
| 4,029,620 | 6/1977 | Chen | 260/29.6 |
| 4,070,323 | 7/1978 | Vanderhoff et al. | 526/312 |
| 4,123,403 | 10/1978 | Warner et al. | 526/88 |
| 4,177,177 | 12/1979 | Vanderhoff et al. | 260/29.2 M |
| 4,200,667 | 4/1980 | Lee et al. | 427/44 |
| 4,222,918 | 9/1980 | Zentner et al. | 260/29.2 EP |
| 4,230,495 | 10/1980 | Lee et al. | 106/14.5 |
| 4,264,700 | 4/1981 | Bayley | 430/137 |
| 4,268,411 | 5/1981 | Iwata et al. | 252/316 |
| 4,309,213 | 1/1982 | Graber et al. | 71/120 |
| 4,330,460 | 5/1980 | Hoffend et al. | 524/849 |
| 4,339,337 | 7/1982 | Tricot et al. | 252/62.54 |
| 4,407,985 | 10/1983 | Muller | 523/161 |
| 4,421,660 | 12/1983 | Hajna | 252/62.54 |
| 4,471,079 | 9/1984 | Enami | 523/161 |
| 4,509,982 | 4/1985 | Iijima | 106/23 |
| 4,525,525 | 6/1985 | Höfer et al. | 524/742 |
| 4,530,961 | 7/1985 | Nguyen et al. | 524/832 |
| 4,532,276 | 7/1985 | Knäble et al. | 524/18 |
| 4,543,376 | 9/1985 | Schupp et al. | 523/414 |
| 4,543,382 | 9/1985 | Tsuchida et al. | 524/267 |
| 4,588,617 | 5/1986 | Oka | 427/443.1 |
| 4,588,757 | 5/1986 | Minnis et al. | 523/406 |
| 4,593,078 | 6/1986 | Kooymans et al. | 523/417 |
| 4,596,844 | 6/1986 | Ohsawa et al. | 523/411 |
| 4,598,108 | 7/1986 | Hoefs | 523/411 |
| 4,599,114 | 7/1986 | Atkinson | 106/300 |
| 4,605,604 | 8/1986 | Kulla et al. | 427/2 |
| 4,608,401 | 8/1986 | Martin | 523/205 |
| 4,620,878 | 11/1986 | Gee | 106/287.15 |
| 4,692,188 | 9/1987 | Ober et al. | 106/23 |

FOREIGN PATENT DOCUMENTS

| | | |
|---|---|---|
| 2491351 | 4/1982 | France . |
| 60-88431 | 4/1985 | Japan . |
| 1156652 | 7/1969 | United Kingdom . |
| 2077693 | 12/1981 | United Kingdom . |

OTHER PUBLICATIONS

Hans H. Kuhn, "Universally Fugitive Tints", 1965 Natl. Conv., The Amer. Assn. of Textile Chemists & Colorists.
B. J. Spalding, "Encapsulated Pigment for Latex Paint", Sep. 3, 1986, Chemical Week, p. 45.
"Dream Screens, A Video Revolution in the Making", Dec. 9, 1985, Business Week, pp. 90-94.
Dennis Allen, "Flat Panels: Beyond the CRT", Feb. 1986, Computer Graphics World, pp. 21-24.
Jean Buffham, "Announcing A New In-Depth Study and Analysis of Flat Panel Displays", International Resource Development, Inc.
Chemical Abstracts, vol. 86, No. 14, 4th Apr. 1977, p. 127, No. 91907r.
Chemical Abstracts, vol. 84, 1976, p. 92, No. 16636e.
Chemical Abstracts, vol. 86, 1977, p. 81, No. 172989w.

*Primary Examiner*—J. L. Barr
*Attorney, Agent, or Firm*—Fitzpatrick, Cella, Harper & Scinto

[57] ABSTRACT

A process for producing particles for use in electrophoretic displays, wherein a heavy, solid pigment preferred for its high contrast or refractive index properties is coated with a polymer starting material. The process significantly reduces the specific density of the resultant particle, and creates particles with smooth polymer surfaces that can be chosen for stability in a given electrophoretic carrier fluid, and possess acceptable electrophoretic characteristics.

10 Claims, No Drawings

ELECTROPHORETIC DISPLAY PARTICLES AND A PROCESS FOR THEIR PREPARATION

BACKGROUND OF THE INVENTION

This invention is related to my copending application entitled PIGMENT ENCAPSULATED LATEX AQUEOUS COLORANT DISPERSIONS, Ser. No. 06/842,609, now U.S. Pat. No. 4,665,107 filed concurrently herewith.

The invention relates to a process for producing particles of polymer encapsulated solid electrophoretic material, below 2 microns in size, wherein a polymer matrix completely surrounds an active ingredient and the resulting particles are configured to have a buoyancy which is effectively neutral with respect to an organic, electrically acceptable conductive carrier fluid.

The active ingredient preferably comprises a pigment, with a primary particle size in the submicron range. A preferred pigment is titanium dioxide ($TiO_2$) in view of its very high contrast ratio and covering power. However, the specific density of titanium oxide compounds is very high, in the range 3.8 to 4.1 gram/c.c., and there is no known electrophoretic display carrier fluid close to that density.

A preferred carrier fluid is tetrachloroethylene, which has a density of 1.6 gram/c.c. A typical electrophoretic display will comprise two plates separated by a space on the order of 50 to 100 microns. The particles must float with substantially neutral buoyancy, in the carrier fluid between the plates, and must respond to an electric field, without unacceptable charge retention or migration. A polymer coating candidate according to the invention proposed herein must not only create particles less than 2 microns in size with an acceptable density, to avoid settling, but the polymer coating must be non-reactive with the carrier fluid and capable of " resisting any tendency to agglomerate with adjacent particles, to avoid coalescent forming at the electrodes.

Since the polymer/electrophoretic carrier fluid interaction is a critical condition, it is valuable to be able substantially to rely uponknown polymer starting material characteristics, when designing a particle electrophoretic display system. The present invention does not chemically alter the polymer structure in the process of coating electrophoretic pigment particles, and since the polymer encapsulates the pigment surface, the pigment surface morphology becomes that of the polymer. Hence, the surface charge of the electrophoretic encapsulated pigment carrier fluid interface can be rendered substantially constant, for different pigments with equivalent primary particle sizes, and equivalent susceptibility to being fully dispersed in the same polymer/solvent carrier fluid system.

The present process invention categorically is not an emulsion polymerization, since the primary particles are not dispersed in a monomer or any mixture of monomers, and no polymerization conditions need to be satisfied as part of an emulsification step. A pertinent prior art technique for producing colloidal size, hydrophobic polymer particulates surrounding discrete particles of inorganic material by emsulsification polymerization is SOLC nee Hajna, U.S. Pat. No. 4,421,660. SOLC illustrates one technique to surround a discrete primary particle such as titanium dioxide with a polymer matrix, but it is not apparent that possible emulsion polymerization candidates will meet the requirement of an electrophoretic display application. The present invention categorically avoids need critically to adjust conditions of emulsification so as to induce polymerization around a core particle, although the present invention critically requires an initial polymer solvent system that must be dispersible in a fluid such as water, and then a complete solvent removal using an energy addition step that also will not create agglomerations or phase separation.

SUMMARY OF THE INVENTION

Unlike emulsification suspension polymerization, however, the present invention is capable of encapsulating particles at very wide concentration ranges, such as polymer to active ingredient ratios of from 1/10 to 10/1, by weight, with the preferred ratio for heavy pigments such as $TiO_2$ being greater then 1.0. Further, the present invention allows mixing and substitution of a wide variety of polymer candidates, having widely varying physical properties, under virtually identical process conditions. Since there is no need to establish hospitable conditions for a polymerization of monomer, the present invention focuses upon matching of physical characteristics of a polymer to the pigment, solvent and water components. Surfactants or wetting agents are used to adjust those physical relationships, and surfactant choice greatly is simplified since the tendency of surfactants to interfere with polymerization reactions is not an issue. Surfactants useful to assist in dispersing of pigment in the polymer/solvent during the initial mixing step are typically cationic in nature. Various surfactant candidates are known for the purposes of wetting inorganic pigments and reducing interfacial tension between the solvents described herein and water to less than 10 dynes/cm. and preferably less than 5 dynes/cm.

Removal of an intermediate organic solvent is a critical aspect of the present invention, since a separation or coagulation of an intermediary discontinuous liquid phase during any removal step will destroy the possibility of creating discrete, submicron solid particles for subsequent use in an electrophoretic carrier fluid. An initial pigment/solvent/polymer mixing step is used to create a solvent mixture that substantially is immiscible with water, or other intermediary dispersing fluid, but with an interfacial tension sufficiently low to allow a stable dispersion of micron size solvent mixture droplets as a discontinuous phase, in a continuous dispersing fluid phase.

The mixing step critically requires a polymer which will dissolve completely in an organic solvent and primary particles sufficiently small and wetted so as to be homogeneously dispersed in the organic solvent A preferred active ingredient candidate for electrophoresis is titanium dioxide, which is an inorganic pigment, with a primary particle size in the range of 0.1 to 0.9 microns, and preferably 0.2 to 0.4 microns. To create a pigment encapsulated latex (PEL), first a homogeneous dispersion of primary pigment particles and a dissolved polymer in an organic solvent is created, with the assistance of a surfactant. That mixture then is dispersed in water to form an emulsion, where water is the continuous phase, and solvent/polymer/pigment liquid droplets less than 2 microns in average diameter comprise a discontinuous phase. The solvent preferably has a vapor pressure higher than water, and is removed in a distillation step that does not result in flocculation of the liquid discontinuous phase, or otherwise cause a phase separation.

Because the pigment primary particle sizes are in the submicron range, significant viscosity problems are avoided in the addition and aqueous dispersion step. The present invention preferably employs commercially available polymers, which are insoluble in water. Accordingly, the viscosity of such polymers as a latex, when dispersed in water, becomes substantially independent of polymer molecular weight and less dependent upon polymer concentration. The density of polymeric latexes preferred for use in this invention are in the range of 0.9 to 1.1 grams/c.c., so that the combined average density of an encapsulted heavy pigment such as titanium dioxide (4.2 grams/c.c.) can be matched ultimately to a preferred carrier fluid, such as tetrachloroethylene (1.6 grams/c.c.) To the extent that the resultant submicron particles are spherical and smooth, they are more stable against flocculation. To the extent a polymer is both inert in the carrier fluid and electrophoretically active, there is less chance of instability so that controlled particle migration is possible in an electric field. The polymer preferably is soluble to less than 5% in water, and also virtually is insoluble in the electrophoretic carrier fluid.

dioxide pigment is defined hereinafter, other metallic oxide pigments known to have acceptable refractive indexes and hiding power for electrophoretic applications may be substituted. The pigment should be in the concentration range of 1 percent to 20 percent by weight, of solvent, and the surfactant in the range of 0.1 percent to 20 percent, by weight, relative to pigment. The surfactant depends substantially upon the surface properties of the pigment, and non-ionic surfactants generally are preferred. Examples of surfactants known to be useful for wetting inorganic particles and reducing interfacial tensions between organic solvents and water are quaternary ammonium salts, ethoxylated alkyl phenols, ethoyxlated alcohols, ethoxylated fatty esters, sulfosuccinate derivatives, alkyl aryl sulfonates, and sorbitan derivatives. Concentration of polymer, expressed as a polymer to pigment weight ratio, should be in the range of 1 to 10, in order substantially to lower the final particle density to that of a carrier fluid. For purposes of this invention, the polymer must be a non-filmformer, and insoluble in the chosen organic solvent. Examples of polymer types considered unseful are polyvinyl butyrals, vinyl acetal polymers, butyrals, styrene/maleic anhydride copolymers, and alkylated vinylpyrrolidone copolymers. The resulting solvent-/polymer pigment mixture preferably has a viscosity of less than approximately 200 centipoise. The organic solvent must have limited solubility in water, typically less than 20%. The mixing step to disperse pigment in polymer may be accomplished by a variety of techniques suitable for a low viscosity medium, such as ball mill rolling, high speed dispersion, or ultrasonic probe vibration. The critical requirement is that the mixed solvent/polymer/pigment fluid is characterized by average pigment primary particle sizes in the submicron range, which ar homogeneously distributed throughout the solvent.

After this initial mixing step, the intermediate mixture is added to water in a concentration range of 1%–50% by weight, and then emulsified, with the preferable techniques being a high frequency blending by ultrasonic probe. The interfacial tension between the organic solvent and the water should be less than 10 dynes/cm, and preferably less than 5 dynes/cm. Depending upon the total system, the addition and dispersing step may require addition of a further surfactant, in the water phase, in order to reduce the interfacial tension to this level. As a matter of control, the average discontinuous liquid droplet phase in the emulsified dispersion should be less than 5 microns, and preferably less than 2 microns, and the emulsion should be stable for at least two hours after preparation.

The solvent removal step is preferably by distillation, and may be accomplished by a roto-vapor, by direct evaporation to air, or any other equivalent means of solvent distillation extraction. If the mixing step has resulted in a sufficiently homogeneous mixture, and the addition and dispersing step has created an emulsion with a uniform discontinuous phase of droplets on the order of 1 or 2 microns, with the droplets containing substantially all of the primary particles, the danger of phase separation or flocculation of the discontinuous phase during solvent removal significantly is diminished. The solvent removal step leaves an aqueous suspension of solid submicron encapsulated particles with smooth surface morphology. The solid encapsulated particles then may be concentrated by evaporation of water, which may either be slow or fast in view of the inherent stability of the aqueous suspension fluid produced by the basic process.

Fractions of solid, coated particles also may be centrifugally concentrated and dried, to form a powder. The fraction of powder with a density matching a given electrophoretic fluid, that also is not reactive to the solid polymer coating, may then be selected, and dispersed in that carrier fluid and used in an electrophoretic display.

It is also contemplated that curing agents may be used with ' polymers of the epoxy resin type, in order to create polymer coatings that solidify through the action of curing agents, and not just solvent removal. One or two-bath curing agent additions are possible to set the polymeric matrix. For examples of resins and curing agents useful, I incorporate by reference to my above-identified, copending application, Ser. No. 06/842,609, now U.S. Pat. No. 4,665,107 filed concurrently herewith.

A preferred embodiment of a process to create improved electropheretic display particles is shown by the following example.

EXAMPLE

Into 12.0 g of the organic solvent, ethyl acetate is dissolved 3.00 g of an epoxy resin comprising bisphenol-A glycidyl either, Epi-Rez 510 (Celanese) and 2.00 g of a polymeric amido amine, Epi-Cure 8515 (Celanese). The mixture is warmed to aid the solution of the polymers After the polymers have been dissolved completely, 1.00 g of a titanium dioxide pigment (0.2 mm. average particle size) Ti-Pure R900-28 (Dupont - pigment white 6) is added and dispersed using an ultrasonic probe until microscopic examination reveals no appreciable pigment agglomerates in the organic solvent-/resin/pigment fluid system.

A separate mixture of 56.0 g. of deionized water and 0.25 g of a cationic surfactant, Katapone VV-328 is made. The organic solvent/resin/pigment mixture is then emulsified into the water mixture using an ultrasonic probe until the solvent phase emulsion drops are uniform and the majority are seen by microscopic examination to be of the size to contain one pigment particle each. The resulting fluid comprises (by weight) approximately 16% solvent, 6.7% epoxy resins, 1.4% pigment and 75% water.

The resulting fluid is then stirred on a magnetic stirrer until the ethyl acetate is removed from the fluid by evaporation. With continued and constant stirring, the fluid is heated to 70 degrees C. and held at that temperature for 2 hours to complete the cure of polymer system.

The fluid is comprised of a dispersion of submicron polymer particles containing one or more pigment particles with a small percentage of non-pigmented polymer particles and non-encapsulated pigment particles in a water system, which comprises (by weight) approximately 8% epoxy resins, 1.8% pigment and 89% water.

Particles with a desired density to be neutrally buoyant in a given carrier fluid for an electrophoretic cell then can be separated by adjusting the fluid density with water-miscible solvents and centrifuging. The desired density fraction can then be freeze-dried to a powder and dispersed into the chosen carrier fluid of an electrophoretic cell. Such particles will show no appreciable settling or creaming in the cell, if they have neutral buoyancy in the carrier fluid and are particles which comprise a carrier fluid resistant polymer shell encapsulating a pigment particle.

The invention described is to be defined by the scope of the appended claims.

I claim:

1. A process for producing submicron sized electrophoretic display particles comprising a polymer matrix surrounding a core of solid active ingredient, said process comprising the steps of:

A. Mixing together an organic solvent, a polymer with characteristics of a non-solubilized latex that is soluble in said solvent but substantially insoluble in water and an active ingredient with characteristics of a pigment substantially insoluble in water to form a homogeneous mixture, wherein said solvent is characterized by a vapor pressure higher than water and said miing is continued under conditions which enable said active ingredient to be dispersed homogeneously in said solvent, without appreciable agglomeration; and B. Adding said solvent/polymer/active ingredient mixture to water, in a concentration range of 1.0% to 50.0% by weight, and dispersing until an emulsion results where solvent/polymer/active ingredient comprises a discontinuous liquid phase with an average droplet size less than 5 microns and water is the continuous phase, wherein said dispersing step is done under conditions of interfacial tension between the organic solvent and the water less than approximately 10 dynes/cm.; and C. Removing substantially all of said solvent to define an aqueous suspension substantially comprising polymer encapsulated particles of active ingredient with an average diameter less than 2 microns; and D. Separating out a fraction of said encapsulated particles with a density substantially equivalent to the density of a given electrophoretic carrier fluid.

2. The process according to claim 1, wherein, in said mixing step, the polymer is soluble to less than 5 percent, in water, and the solvent is soluble to less than 20% in water, and said active ingredient is a pigment, with a primary particle size in the submicron range.

3. The process according to claim 2, wherein, in said mixing step, the polymer has a density in the range of 0.9 to 1.1 gram/c.c., the active ingredient comprises solid primary particles having average diameters in range between 0.1 to 0.9 microns, and the concentration ratio, by weight, of polymer to encapsulated active material for each submicron sized particle is greater than 1.0.

4. The process according to claim 2, wherein said dispersing step further comprises the addition of a surfactant, in the range between 0.1 percent and 20 percent, by weight, of active ingredient material, and the concentration ratio, by weight, of polymer to encapsulated active material for each submicron sized particle is between 1.0 and 10.0.

5. The process according to claim 2, wherein, in said mixing step, the concentration, by weight, of active material to solvent is between 1.0 percent and 20 percent, said polymer has a viscosity of less than 200 centipoise when dissolved in said solvent and said dispersing step is done ultrasonically, until a stable emulsion of discontinuous phase droplets that comprise a polymer and solvent matrix encapsulating one or more active material primary particles as a solid core, is produced.

6. The process to claim 2, wherein in said mixing step, the polymer has a viscosity of less than 200 centipoise when dissolved therein, and is selected from the group consisting of polyvinyl butyral, vin acetal polymers, butyrals, styrene maleic anhydride copolymers, and alkylate vinylpyrrolidone copolymers, and the solvent is selected from the group consisting of ethyl acetate, methyl isobutyl ketone, and methylene chloride.

7. The process of claim 2 wherein, the active ingredient is titanium dioxide with an average primary particle size in the range of 0.1 to 0.9 microns; the organic solvent fluid is ethyl acetate; said interfacial tension is reduced by a cationic surfactant added in said dispersing step; the polymer comprises a system of an epoxy resin and a curing agent; and said removal step further comprises heating the aqueous suspension to cure said polymer system and create solid encapsulated particles with a smooth surface morphology 8. The product of electrophoretic particles made by a process according to claim 7.

9. The process of claim wherein, said fraction separated step further comprises selecting an encapsulated particle whose density substantially matches the density of tetrachloroethylene, and dispersing said fraction into tetrachloroethylene carrier fluied to form a neutrally buoyant electrophoretic fluid mixture.

10. The product of an electrophoretic fluid mixture made by the process of claim 9.

* * * * *